US012568473B2

(12) United States Patent
Meir et al.

(10) Patent No.: US 12,568,473 B2
(45) Date of Patent: Mar. 3, 2026

(54) DYNAMIC RECEIVER TYPE SELECTION BY NETWORK NODE

(71) Applicant: QUALCOMM Incorporated, San Diego, CA (US)

(72) Inventors: Elad Meir, Ramat Gan (IL); Gideon Shlomo Kutz, Ramat Hasharon (IL); Tal Oved, Modiin (IL); Assaf Touboul, Netanya (IL); Jacob Pick, Mevaseret Zion (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 18/185,039

(22) Filed: Mar. 16, 2023

(65) Prior Publication Data

US 2024/0314743 A1 Sep. 19, 2024

(51) Int. Cl.
*H04W 72/02* (2009.01)
*H04W 72/54* (2023.01)

(52) U.S. Cl.
CPC ........... *H04W 72/02* (2013.01); *H04W 72/54* (2023.01)

(58) Field of Classification Search
CPC ... H04L 5/0007; H04L 5/0053; H04L 5/0091; H04W 72/02; H04W 72/1273; H04W 72/23; H04W 72/51; H04W 72/54
See application file for complete search history.

(56) References Cited

U.S. PATENT DOCUMENTS

| | | | |
|---|---|---|---|
| 2007/0184811 A1* | 8/2007 | Ballantyne | H04B 1/109 455/343.2 |
| 2009/0254797 A1* | 10/2009 | Wu | H03M 13/3746 714/794 |
| 2012/0195399 A1* | 8/2012 | Zhu | H04L 27/2636 375/341 |
| 2012/0250731 A1* | 10/2012 | Taghavi Nasrabadi | H04W 88/06 375/147 |
| 2013/0343491 A1* | 12/2013 | Eliaz | H04L 25/03197 375/340 |
| 2014/0126403 A1* | 5/2014 | Siomina | H04J 11/005 370/252 |
| 2014/0286219 A1* | 9/2014 | Siomina | H04W 24/10 370/311 |

(Continued)

OTHER PUBLICATIONS

"Physical Layer Abstraction Method for MMSE-SIC Type Receiver"; Zte et al.; 3GPP TSG RAN WG1 Meeting #86bis R1-1608954 Lisbon, Portugal, Oct. 10-14, 2016 (Year: 2016).*

*Primary Examiner* — Benjamin H Elliott, IV
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a network node, supported receiver type information including a list of one or more receiver types supported by the UE. The UE may receive, from the network node, an indication of one or more selected receiver types, from the one or more receiver types supported by the UE, to be used for receiving one or more portions of a downlink communication. The UE may receive, from the network node, the one or more portions of the downlink communication using the one or more selected receiver types. Numerous other aspects are described.

31 Claims, 11 Drawing Sheets

500 ➞

530 ➞

| Receiver type | Receiver configuration | Power consumption factor |
|---|---|---|
| 1 | PSRD + soft decoding LDPC + 6 bit LLR quantization | 1 |
| 2 | MMSE+soft decoding LDPC + 6 bit LLR quantization | 0.85 |
| 3 | MMSE+soft decoding LDPC + 4 bit LLR quantization | 0.77 |

(56) References Cited

U.S. PATENT DOCUMENTS

| | | | |
|---|---|---|---|
| 2014/0286459 A1* | 9/2014 | Eliaz .................. | H04L 27/3818 |
| | | | 375/340 |
| 2015/0312074 A1* | 10/2015 | Zhu ..................... | H04L 5/0046 |
| | | | 370/329 |
| 2016/0173148 A1* | 6/2016 | Kazmi ................... | H04B 1/10 |
| | | | 455/296 |
| 2016/0278103 A1* | 9/2016 | Kazmi ................ | H04W 28/18 |
| 2018/0287828 A1* | 10/2018 | Tavares ................ | H04J 11/004 |
| 2019/0021092 A1* | 1/2019 | Fakoorian ........... | H04B 7/0854 |
| 2019/0149362 A1* | 5/2019 | Jalloul ............... | H04L 25/0204 |
| | | | 375/341 |
| 2019/0349946 A1* | 11/2019 | Åström ................... | H04B 1/10 |
| 2020/0028617 A1* | 1/2020 | Landis ................ | H04L 1/0003 |
| 2020/0196317 A1* | 6/2020 | Fakoorian ........... | H04B 7/0854 |
| 2024/0314743 A1* | 9/2024 | Meir .................... | H04L 5/0091 |

* cited by examiner

500 —

530 —

| Receiver type | Receiver configuration | Power consumption factor |
|---|---|---|
| 1 | PSRD + soft decoding LDPC + 6 bit LLR quantization | 1 |
| 2 | MMSE+soft decoding LDPC + 6 bit LLR quantization | 0.85 |
| 3 | MMSE+soft decoding LDPC + 4 bit LLR quantization | 0.77 |

| Demodulator | | | Decoder | | | | HARQ Buffer | |
|---|---|---|---|---|---|---|---|---|
| Search space size | Demod type | Power factor | Num. of Iterations | LLR quant. | Power factor | | Quant. | Power factor |
| 256 | PSRD | 0.8 | 12 | 6 | 1 | | 6 | 0.4 |
| 64 | PSRD | 0.64 | 10 | 6 | 0.88 | | 5 | 0.33 |
| NA | MMSE | 0.16 | 8 | 6 | 0.74 | | 4 | 0.27 |
| | | | 6 | 4 | 0.42 | | | |
| ⋮ | | | | | | | | |

FIG. 5C

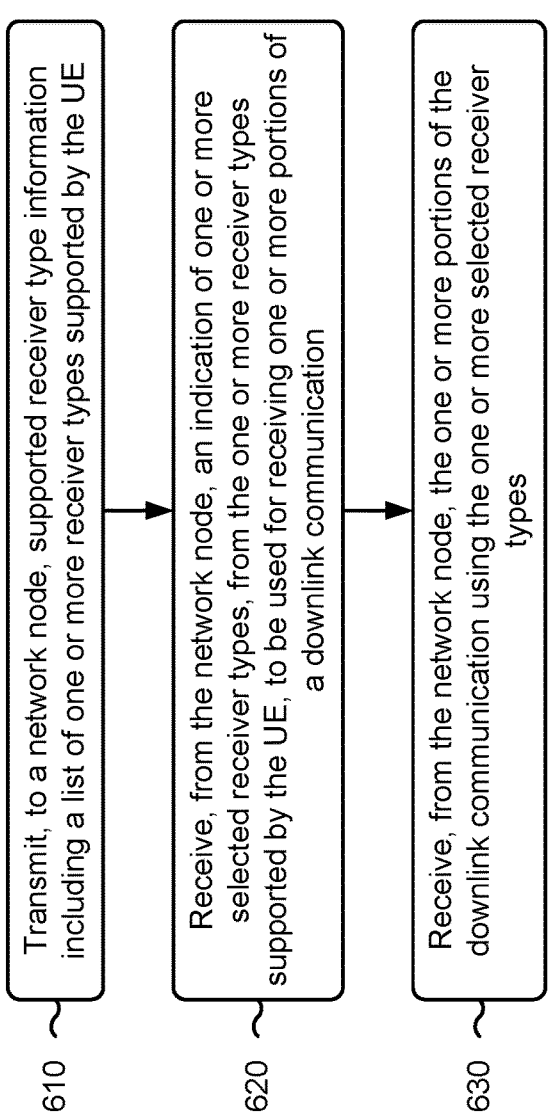

Transmit, to a network node, supported receiver type information including a list of one or more receiver types supported by the UE

610

Receive, from the network node, an indication of one or more selected receiver types, from the one or more receiver types supported by the UE, to be used for receiving one or more portions of a downlink communication

620

Receive, from the network node, the one or more portions of the downlink communication using the one or more selected receiver types

Figure 8:
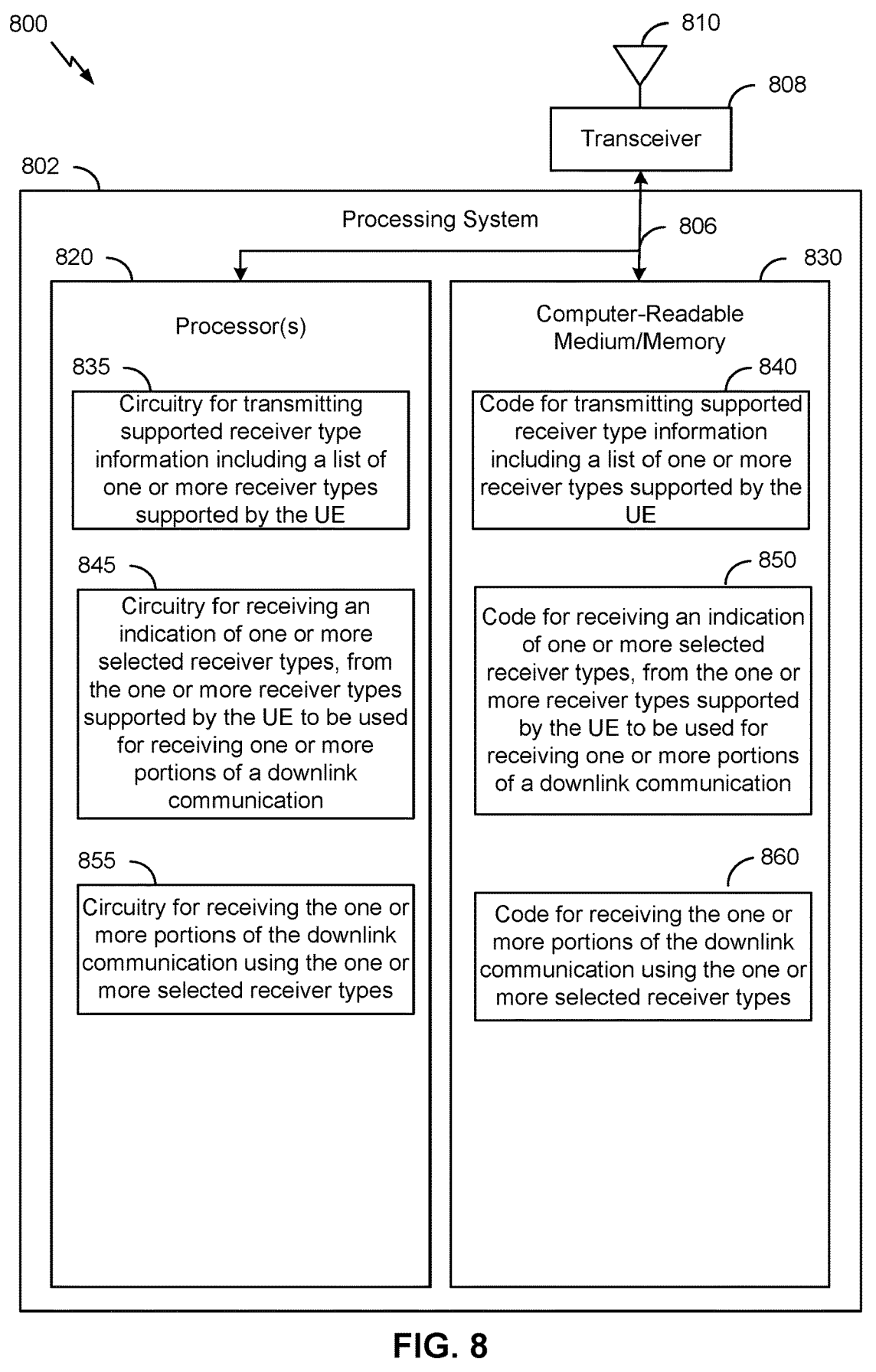

Transceiver

802

Processing System

806

820

830

Processor(s)

Computer-Readable
Medium/Memory

835

Circuitry for transmitting
supported receiver type
information including a list of
one or more receiver types
supported by the UE

840

Code for transmitting supported
receiver type information
including a list of one or more
receiver types supported by the
UE

845

Circuitry for receiving an
indication of one or more
selected receiver types, from
the one or more receiver types
supported by the UE to be used
for receiving one or more
portions of a downlink
communication

850

Code for receiving an indication
of one or more selected
receiver types, from the one or
more receiver types supported
by the UE to be used for
receiving one or more portions
of a downlink communication

855

Circuitry for receiving the one or
more portions of the downlink
communication using the one or
more selected receiver types

860

Code for receiving the one or
more portions of the downlink
communication using the one or
more selected receiver types

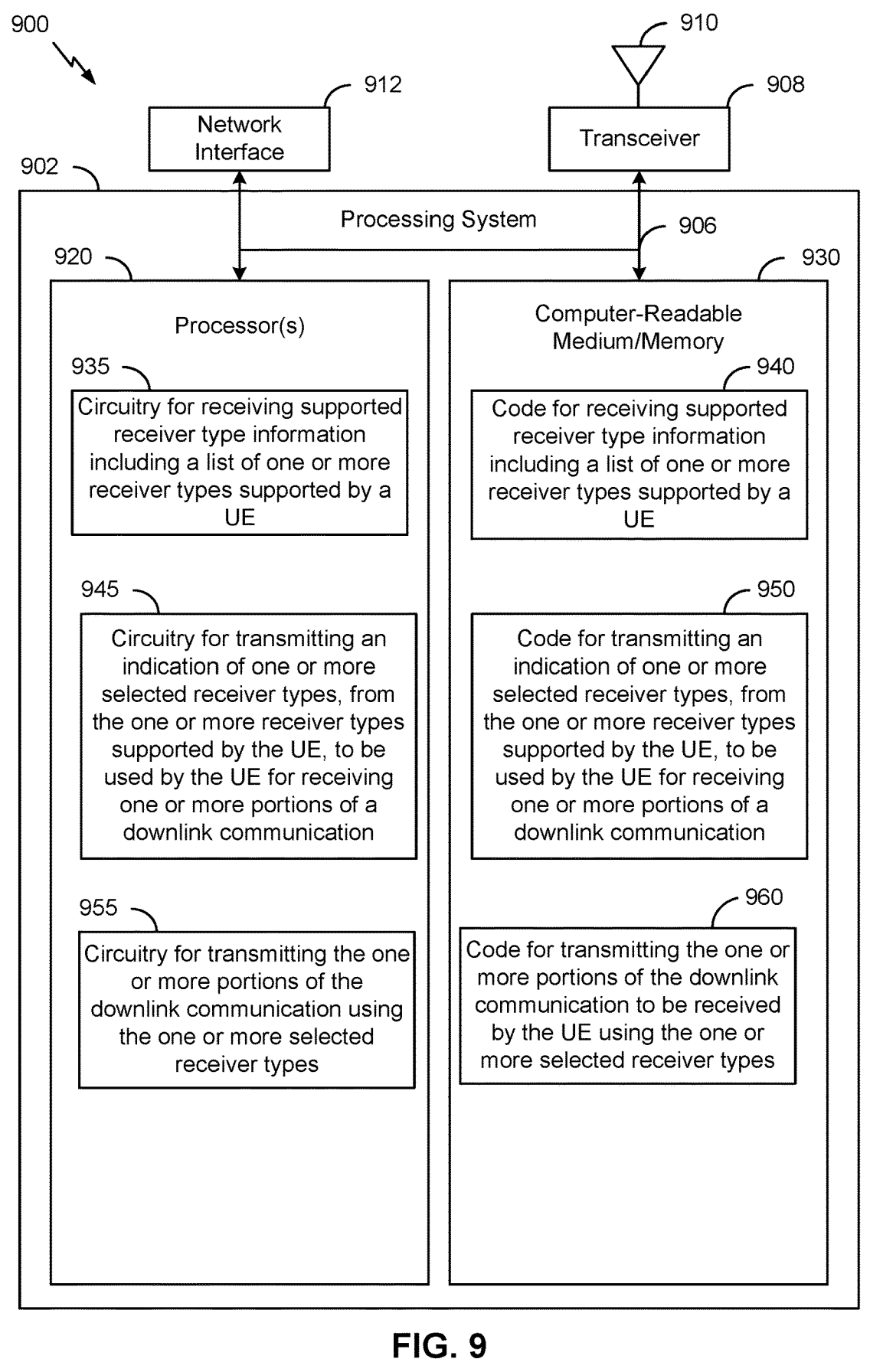

Network
Interface

908

Transceiver

902

Processing System

906

920

930

Processor(s)

**Computer-Readable
Medium/Memory**

935

940

Circuitry for receiving supported
receiver type information
including a list of one or more
receiver types supported by a
UE Code for receiving supported
receiver type information
including a list of one or more
receiver types supported by a
UE

945

950

Circuitry for transmitting an
indication of one or more
selected receiver types, from
the one or more receiver types
supported by the UE, to be
used by the UE for receiving
one or more portions of a
downlink communication Code for transmitting an
indication of one or more
selected receiver types, from
the one or more receiver types
supported by the UE, to be
used by the UE for receiving
one or more portions of a
downlink communication

955

960

Circuitry for transmitting the one
or more portions of the
downlink communication using
the one or more selected
receiver types Code for transmitting the one or
more portions of the downlink
communication to be received
by the UE using the one or
more selected receiver types

FIG. 9

DYNAMIC RECEIVER TYPE SELECTION BY NETWORK NODE

FIELD OF THE DISCLOSURE

Aspects of the present disclosure generally relate to wireless communication and to techniques and apparatuses for dynamic receiver type selection by a network node.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes transmitting, to a network node, supported receiver type information including a list of one or more receiver types supported by the UE. The method includes receiving, from the network node, an indication of one or more selected receiver types, from the one or more receiver types supported by the UE, to be used for receiving one or more portions of a downlink communication. The method includes receiving, from the network node, the one or more portions of the downlink communication using the one or more selected receiver types.

Another aspect provides a method for wireless communication by a network node. The method includes receiving supported receiver type information including a list of one or more receiver types supported by a UE. The method includes transmitting an indication of one or more selected receiver types, from the one or more receiver types supported by the UE, to be used by the UE for receiving one or more portions of a downlink communication. The method includes transmitting the one or more portions of the downlink communication to be received by the UE using the one or more selected receiver types.

Other aspects provide: an apparatus operable, configured, or otherwise adapted to perform any one or more of the aforementioned methods and/or those described herein with reference to and as illustrated by the drawings and specification; a non-transitory, computer-readable medium comprising computer-executable instructions that, when executed by a processor of an apparatus, cause the apparatus to perform the aforementioned methods and/or those described herein with reference to and as illustrated by the drawings and specification; a computer program product embodied on a computer-readable storage medium comprising code for performing the aforementioned methods and/or those described herein with reference to and as illustrated by the drawings and specification; and/or an apparatus comprising means for performing the aforementioned methods and/or those described herein with reference to and as illustrated by the drawings and specification. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5C are diagrams illustrating an example associated with dynamic receiver selection by a network node, in accordance with the present disclosure.

FIG. 6 shows a method for wireless communication by a UE.

FIG. 8 is a diagram illustrating an example of an implementation of code and circuitry for a communications device, in accordance with the present disclosure.

FIG. 9 is a diagram illustrating an example of an implementation of code and circuitry for a communications device, in accordance with the present disclosure.

DETAILED DESCRIPTION

Figure 1:
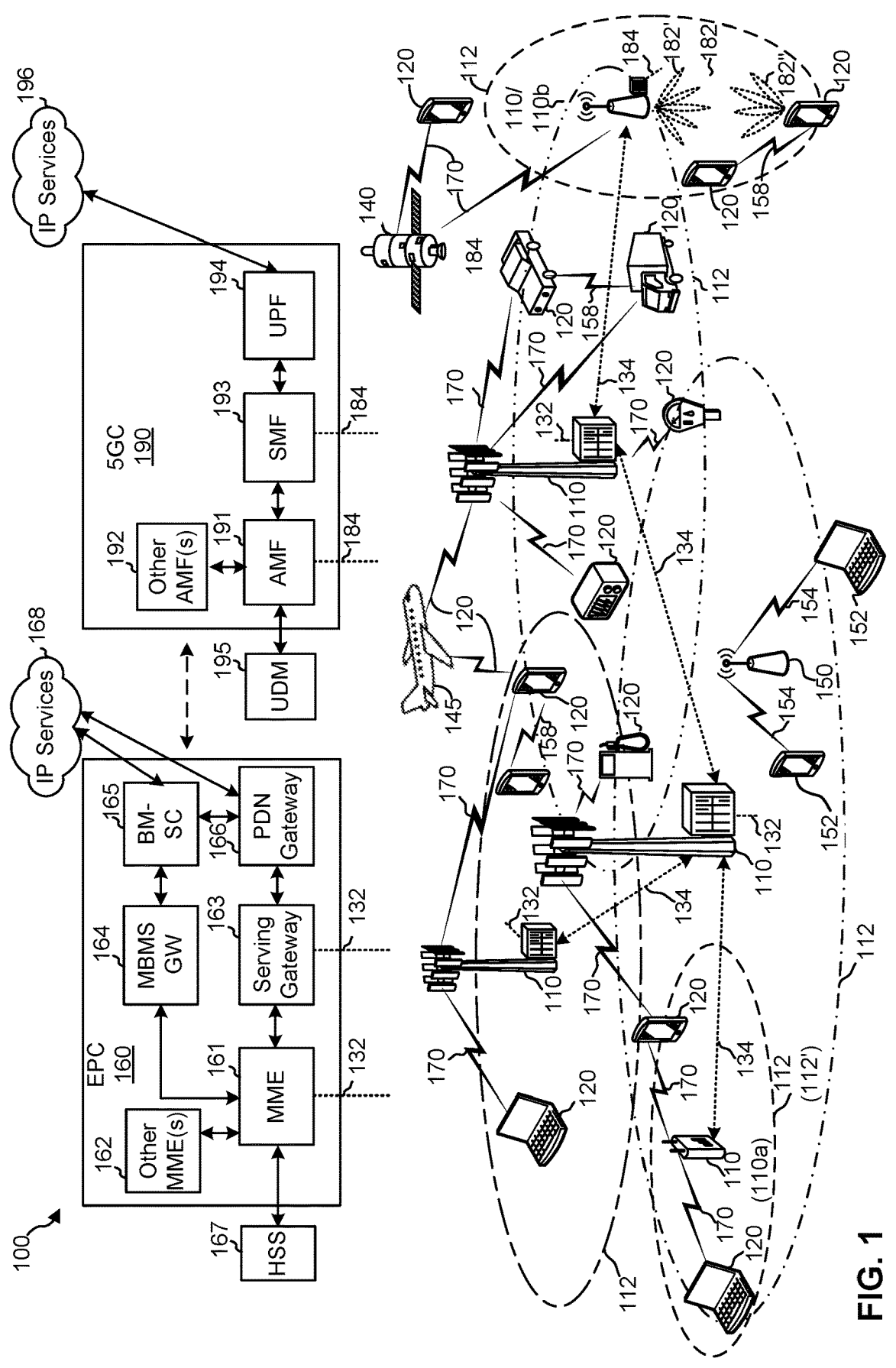
FIG. 1 depicts an example of a wireless communications network, in accordance with the present disclosure.

Aspects of the present disclosure provide apparatuses, methods, processing systems, and computer-readable mediums for dynamic receiver type selection by a network node.

A user equipment (UE) may communicate with a network node and/or other wireless communication devices in a wireless network. The UE may receive wireless signals transmitted by the network node and/or other wireless communication devices. The UE may process the wireless signals using various receiver modules in a receive (Rx) chain of the UE. For example, the receiver modules in the Rx chain may include a demodulator and a decoder, among other examples. The demodulator may perform demodulation of received wireless signals using a demodulation algorithm. Different demodulation algorithms may consume different amounts of power when performed by the UE. For example, minimum mean squared error (MMSE) demodulation (e.g., demodulation with MMSE equalization) is a relatively simple demodulation algorithm that consumes a relatively small amount of power, and per-stream recursive demapping (PSRD) demodulation (e.g., demodulation with PSRD equalization) is a more computationally expensive demodulation algorithm that consumes a larger amount of power, as compared with MMSE demodulation. An ongoing challenge in wireless communications is reducing UE power consumption. However, demodulation algorithms that incur fewer power costs, such as MMSE, typically are less accurate than demodulation algorithms that incur great power costs, such as PSRD. Thus, MMSE demodulation (or another computationally simple demodulation algorithm) may reduce UE power consumption, but may also result in reduced network performance, such as reduced throughput and/or spectral efficiency. PSRD demodulation (or another computationally expensive demodulation algorithm) may prevent decreased throughput and/or spectral efficiency, but may result in higher UE power consumption, which may cause reduced UE battery life.

In OFDM systems, network performance (e.g., throughput and/or spectral efficiency) may be disproportionately affected by the resources with the poorest channel conditions. Due to frequency and time selectivity, an allocation of downlink resources for a downlink communication from a network node to a UE may include resources of varying quality. In some aspects, intelligently selecting the receiver configuration (e.g., including the demodulation algorithm, among other examples) per resource or group of resources may reduce UE power consumption used for receiving a downlink communication, without significantly penalizing throughput and/or spectral efficiency. In some examples, a UE may select a receiver configuration (e.g., including the demodulation algorithm) to attempt to minimize power consumption without adversely affecting performance. However, such intelligent selection of the receiver configuration by the UE consumes UE power and may require UEs to have a high level of complexity.

Some techniques described herein provide dynamic receiver type selection by a network node, such as a base station or one or more components of a disaggregated base station architecture. A UE may report a list of supported receiver types, which may correspond to configurations of a demodulator and/or other receiver modules of the UE. The network node may select receiver types, of the supported receiver types, to be used by the UE to receive different portions of a downlink communication allocated for the UE. The network node may transmit an indication of the selected receiver types for the different portions of the downlink communication to the UE, and the UE may receive the different portions of the downlink communication using the indicated selected receiver types for the different portions of the downlink communication. Furthermore, in some aspects described herein, the network node may select different receiver types to be used by the UE for receiving different downlink resources of the downlink communication (e.g., on a per resource element basis, per resource block basis, or using another granularity of downlink resources) based at least in part on channel conditions (also referred to as "link conditions") between the UE and the network node. For example, the network node may select the different receiver types for the different downlink resources based at least in part on the channel conditions, as well as power metrics and performance metrics for the different receiver types.

As a result, the network node may perform intelligent selection of the receiver configurations (e.g., including the demodulation algorithm) to be used by the UE, which may reduce UE power consumption and UE complexity as compared with UE selection of receiver configurations. Furthermore, by selecting different receiver types for different downlink resources of the downlink communication based on the channel conditions, the network node can instruct the UE to use a receiver configuration with a higher power cost (e.g., PSRD demodulation) only for resources with the poorest channel, and a receiver configuration with a lower power cost (e.g., MMSE demodulation) for other resources, which may reduce UE power consumption without a significant decrease in throughput and spectral efficiency.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
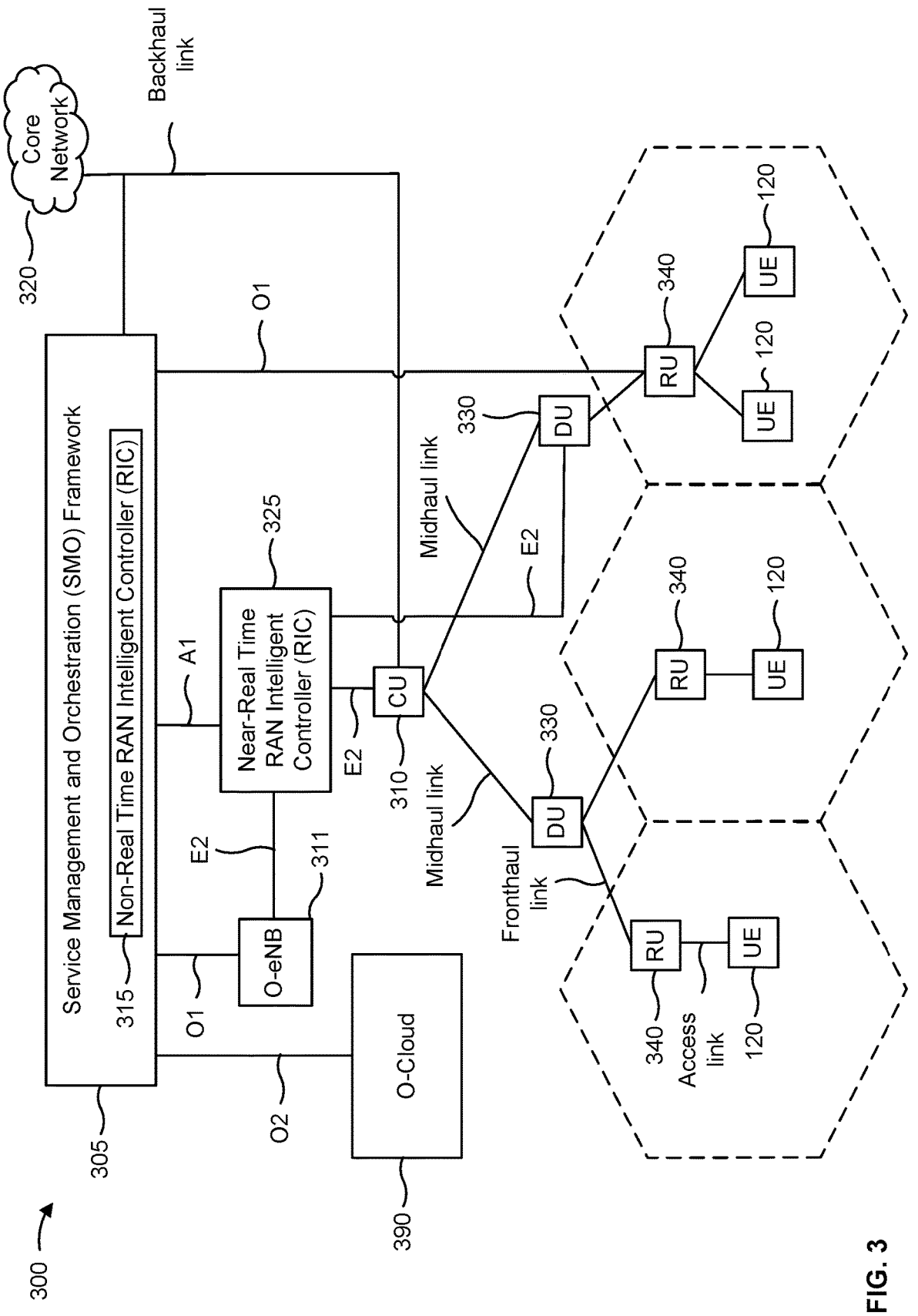
FIG. 3 depicts an example disaggregated base station architecture, in accordance with the present disclosure.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network (RAN) architecture, such as an Open RAN (O-RAN) architecture or a Virtualized RAN (vRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, the 3rd Generation Partnership Project (3GPP) currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mm Wave or near mmWave radio frequency bands (e.g., a mmWave base station such as BS 110b) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110b in FIG. 1) may utilize beamforming with a UE 120 to improve path loss and range, as shown at 182. For example, BS 110b and the UE 120 may each include a plurality of antennas, such as antenna elements, antenna panels, and/or antenna arrays to facilitate the beamforming. In some cases, BS 110b may transmit a beamformed signal to UE 120 in one or more transmit directions 182'. UE 120 may receive the beamformed signal from the BS 110b in one or more receive directions 182". UE 120 may also transmit a beamformed signal to the BS 110b in one or more transmit directions 182". BS 110b may also receive the beamformed signal from UE 120 in one or more receive directions 182'. BS 110b and UE 120 may then perform beam training to determine the best receive and transmit directions for each of BS 110b and UE 120. Notably, the transmit and receive directions for BS 110b may or may not be the same. Similarly, the transmit and receive directions for UE 120 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
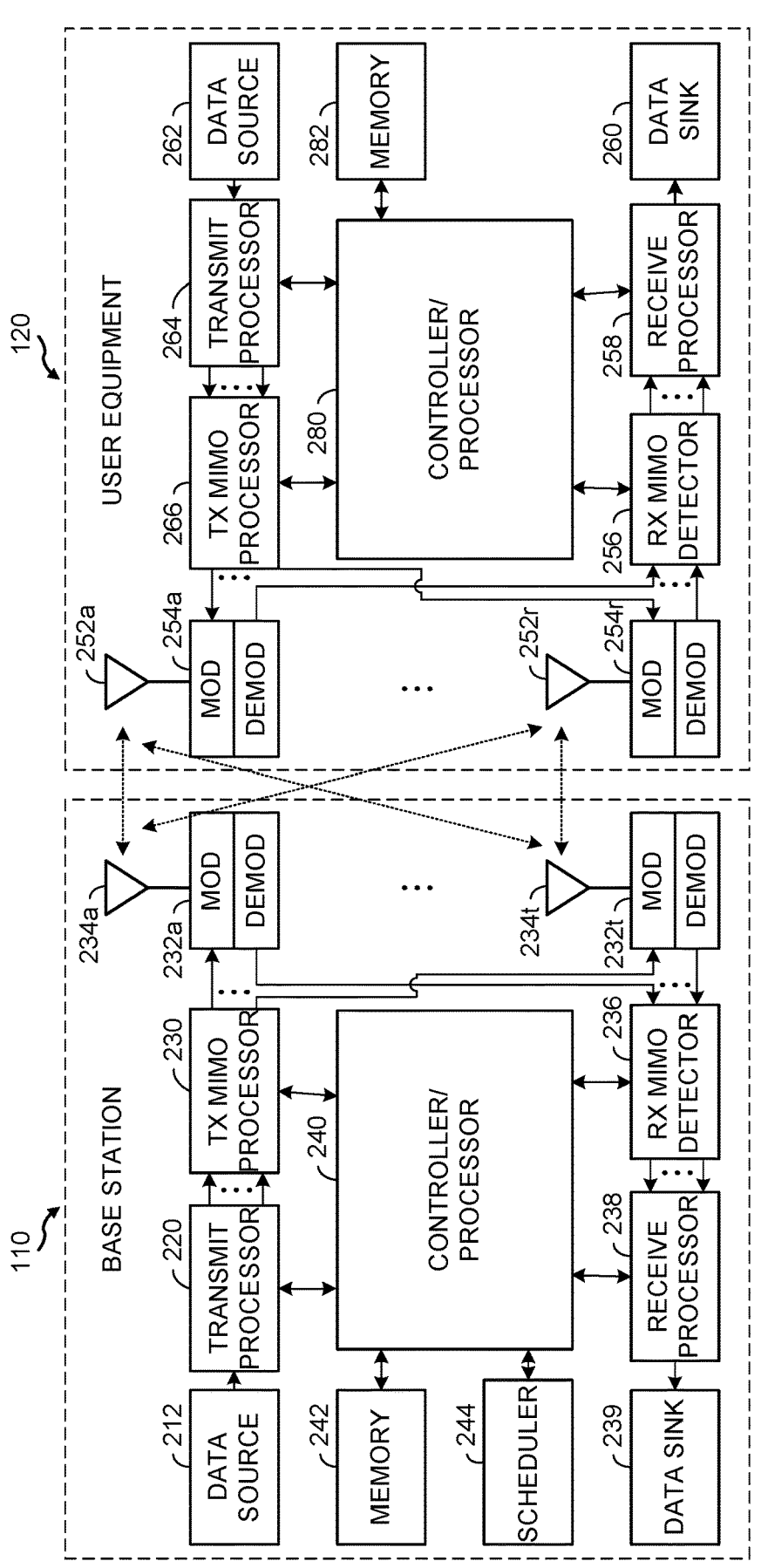
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various functional components (e.g., 258, 264, 266, and 280), antennas 252a-r (collectively 252), transceivers 254a-r (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) MIMO processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

UE 120 includes antennas 252a-252r that may receive the downlink signals from the BS 110 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

Receive (RX) MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 110.

At BS 110, the uplink signals from UE 120 may be received by antennas 234a-234t, processed by the demodulators in transceivers 232a-232t, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an O-RAN (such as the network configuration sponsored by the O-RAN Alliance), or a vRAN (also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figures 4A, 4B, 4C, 4D:
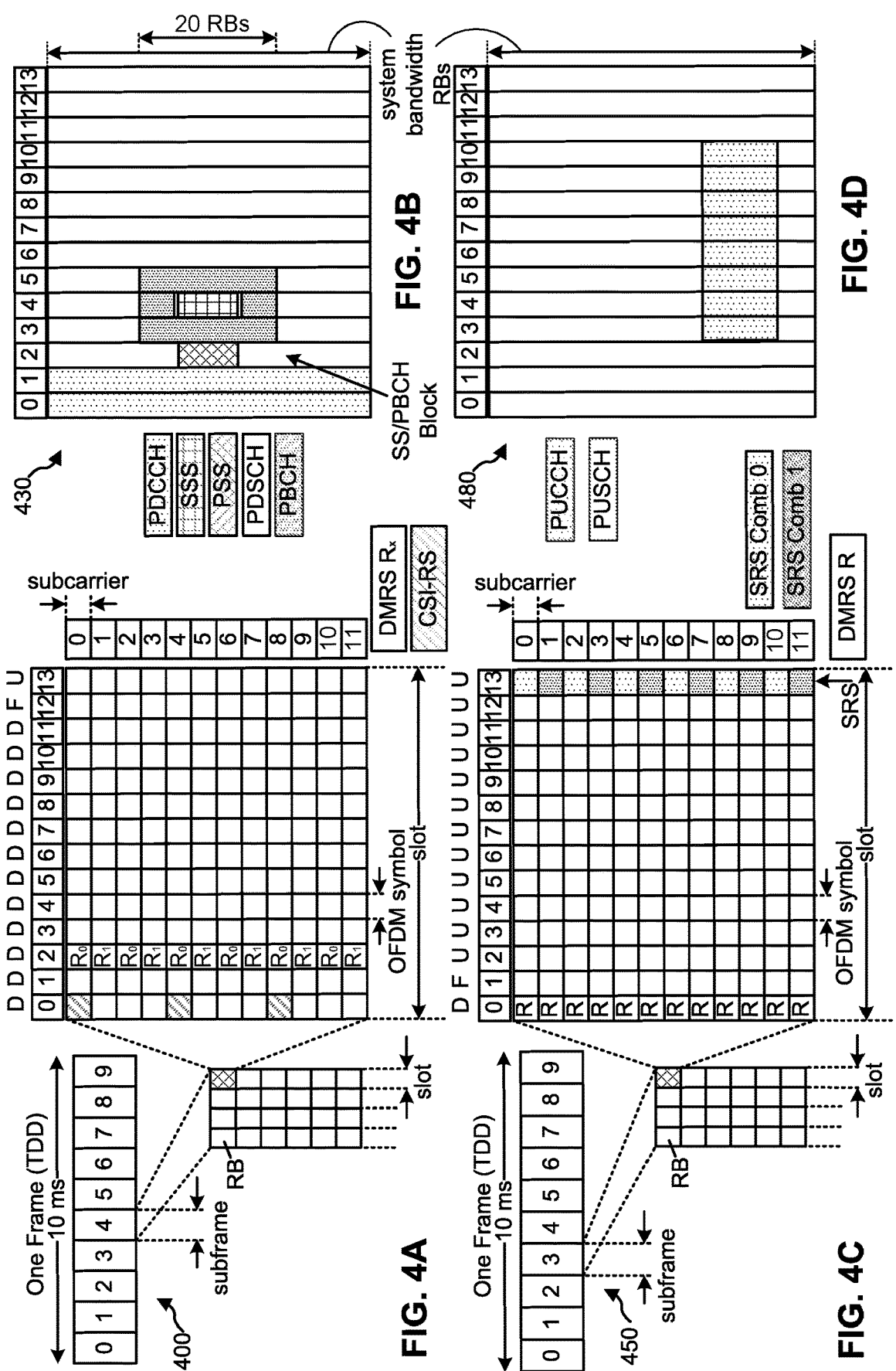
FIGS. 4A, 4B, 4C, and 4D depict aspects of data structures for a wireless communications network, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing. OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologics ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2^{\mu}$ slots/subframe. The subcarrier spacing and symbol length/duration are a function of the numerology. The subcarrier spacing may be equal to $2^{\mu} \times 15$ kHz, where u is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The PDCCH carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 120) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block (also referred to as an SS block (SSB)). The MIB provides a number of RBs in the system bandwidth and a system frame number (SFN). The PDSCH carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit SRSs. The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5A:
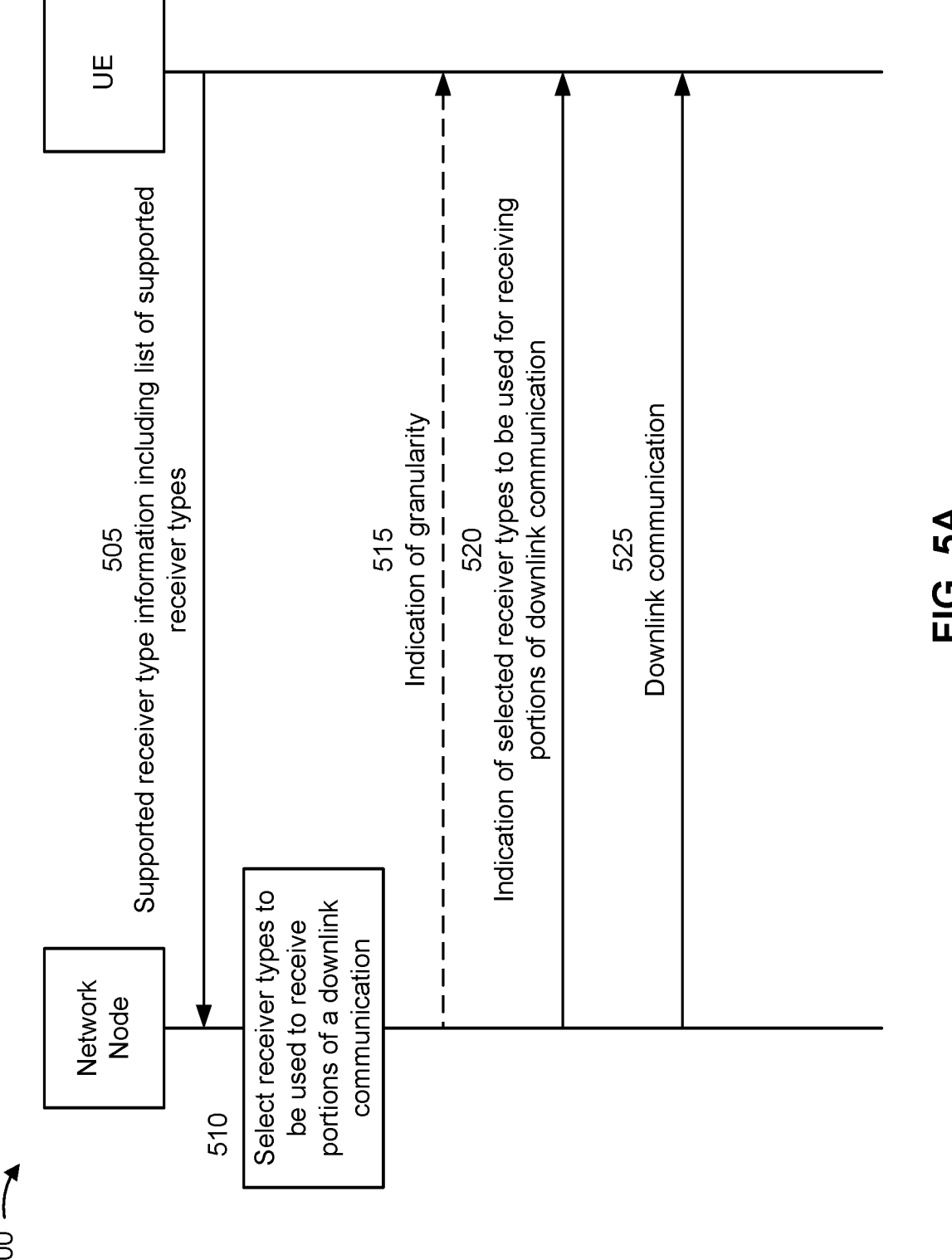

FIGS. 5A-5C are diagrams illustrating an example 500 associated with dynamic receiver selection by a network node, in accordance with the present disclosure. As shown in FIG. 5A, example 500 includes communication between a network node (e.g., BS 110 or one or more components of a disaggregated base station as discussed with respect to FIG. 3) and a UE (e.g., UE 120). In some aspects, the network node and the UE may be included in a wireless network, such as wireless network 100. The network node and the UE may communicate via a wireless access link, which may include an uplink and a downlink.

As shown in FIG. 5A, and by reference number 505, the UE may transmit, to the network node, supported receiver type information including a list of supported receiver types. The network node may receive the supported receiver type information transmitted by the UE. The list of supported receiver types may include one or more receiver types supported by the UE. A receiver type may be a type or configuration (e.g., of one or more parameters) of one or more components (e.g., receiver modules) of an Rx chain of the UE. The Rx chain of the UE may include a set of receiver modules that correspond to respective components, mechanisms, and/or algorithms used for receiving signals and obtaining data from the signals. In some aspects, the Rx chain of the UE may utilize OFDM/OFDMA. In some aspects, one or more components (e.g., receiver modules) of the Rx chain may be implemented in receive processor 258, MIMO detector 256, transceivers 254a-254r, and/or controller/processor 280, as described above in connection with FIG. 2. For example, the receiver modules of the Rx chain of the UE may include a demodulator (or equalizer), a decoder, and/or a HARQ buffer, among other examples.

In some aspects, the supported receiver type information may be signaled rarely by the UE. For example, the UE may transmit the supported receiver type information to the network node when connecting to the wireless network via the network node, and/or by request of the UE to change the supported receiver type information transmitted when connecting to the wireless network. In some examples, the UE may transmit the supported receiver type information, including the list of supported receiver types, to the network node in an RRC message or a MAC control element (MAC-CE).

The list of supported receiver types may indicate receiver configurations (e.g., configurations for one or more Rx modules in the Rx chain) supported by the UE. In some aspects, each supported receiver type in the list of supported receiver types may correspond to a combination of algorithms and/or parameters for multiple Rx modules of the Rx chain that is supported by the UE. In some aspects, the UE may report, to the network node, a respective power consumption metric for each receiver type supported by the UE (e.g., for each supported receiver type in the list of supported receiver types). For example, the respective power consumption metric for each supported receiver type may be included in the supported receiver type information transmitted to the network node by the UE. The power consumption metric, for a receiver type, may be an indication of UE power consumption for downlink reception using the receiver configuration corresponding to the receiver type. The power consumption metric may indicate a relative power consumption of a receiver type, as compared to one or more other receiver types. In some aspects, the power consumption metric may indicate a scaling factor (e.g., a multiply factor) with respect to a reference receiver type. For example, the reference receiver type may correspond to a certain reference receiver configuration (e.g., an MMSE demodulator and a low-density parity check (LDPC) decoder with 8 LDPC iterations with 4 bits of log-likelihood ratio (LLR) quantization), or the reference receiver type may be a most complex receiver type (e.g., a receiver type with the highest power consumption) among the supported receiver types in the list of supported receiver types.

In some aspects, the network node may determine or derive a performance metric for each supported receiver type. For example, the performance metric may be a measurement or estimation of a downlink decoding accuracy expected for the receiver configuration corresponding to a receiver type. In some aspects, the network node may determine (e.g., learn) a respective performance metric for each supported receiver type in the list of supported receiver types using a machine learning model, such as a neural network. In this case, the network node (or another network device) may train the machine learning model to input a set of parameters corresponding to a receiver type (e.g., parameters representing the configurations for the Rx modules) and output a performance metric for the receiver type.

In some other aspects, the UE may report performance metrics for the supported receiver types to the network node. For example, the performance metrics for the supported receiver types may be included in the supported receiver type information transmitted to the network node by the UE. In this case, the UE may report a respective performance metric for each supported receiver type, or the UE may report performance metrics for different receiver module types (e.g., configuration options) for one or more receiver modules (e.g., components) in the Rx chain of the UE. For example, the UE may report, for a receiver module, performance metrics that indicate performance using the receiver module at selected pre-defined operating points (e.g., with various configuration options). In one example, the performance metrics for a demodulator may include, for each supported demodulator algorithm, a number of layers that can be handled using the demodulator algorithm and/or a diversity order of the demodulator algorithm. In another example, the performance metrics for an LDPC decoder may indicate performance for various quantities of LDPC iterations and/or different log-likelihood ratio (LLR) quantizations.

In some aspects, a receiver type can be represented as a scalar value, such as an index value. For example, each supported receiver type, in the list of supported receiver types, may be associated with a respective index. FIG. 5B shows an example 530 of supported receiver types that are associated with (e.g., represented or identified by) respective indexes. In example 530, the supported receiver types include a first receiver type (receiver type 1) that is associated with an index of 1, a second receiver type (receiver type 2) that is associated with an index of 2, and a third receiver type (receiver type 3) that is associated with an index of 3. In some aspects, as shown in FIG. 5B, each supported receiver type may correspond to a receiver configuration (e.g., a whole receiver configuration) that includes a combination of configurations for multiple Rx modules in the Rx chain of the UE. That is, each supported receiver type may correspond to a respective configuration of module types (e.g., configuration options) for a set of Rx modules in the Rx chain of the UE. For example, each supported receiver type may indicate a combined configuration of a demodulator (or equalizer), a decoder, and a HARQ buffer, among other examples. In example 530, receiver type 1 corresponds to PSRD demodulation and soft LDPC decoding with 6 bit LLR quantization, receiver type 2 corresponds to MMSE demodulation and soft LDPC decoding with 6 bit LLR quantization, and receiver type 3 corresponds to MMSE demodulation and soft LDPC decoding with 4 bit LLR quantization.

As further shown in FIG. 5B, each receiver type may be associated with a respective power consumption metric that indicates a power consumption for the receiver type. In this example, the power consumption metric indicates a scaling factor (e.g., a power consumption factor) with respect to power consumption of the most complex supported receiver type (e.g., receiver type 1). As shown, the power consumption factor for receiver type 1 is 1, the power consumption factor for receiver type 2 is 0.85, and the power consumption factor for receiver type 3 is 0.77. In some aspects, the supported receiver type information, transmitted by the UE to the network node, may indicate the respective indexes and the respective power consumptions factors for the supported receiver types without indicating the specific receiver configurations of the supported receiver types. In some aspects, the network node may store the indexes for the supported receiver types and the corresponding power consumption factors in a data structure (e.g., a tables). As discussed above, performance metrics for the different supported receiver types may be learned by the network node or reported by the UE. In some aspects, the network node may store the performance metrics (e.g., the performance metrics learned by the network node or reported by the UE) in a data structure (e.g., a table), per receiver type, together with the index and the power consumption factor for each receiver type.

In some aspects, the supported receiver type information may indicate supported configurations per receiver module/component for different receiver modules/components in the Rx chain of the UE. FIG. 5C shows an example 540 of supported configurations listed per receiver module for a set of receiver modules in the Rx chain of the UE. In example 540, supported configuration options are listed for a demodulator, a decoder, and a HARQ buffer. The configuration options for a given receiver module (e.g., the demodulator, the decoder, or the HARQ buffer) may be referred to as module types. In some aspects, the list of the one or more receiver types, included in the supported receiver type information, may include a respective list of supported module types for each receiver module of a set of receiver modules in the Rx chain of the UE. In example 540, the supported module types for the demodulator (e.g., supported demodulator types) include PSRD demodulation with a search space size of 256, PSRD demodulation with a search space size of 64, and MMSE demodulation. In example 540, the supported module types for the decoder (e.g., supported decoder types) include decoding with 12 LDPC iterations with 6 bit LLR quantization, decoding with 10 LDPC iterations with 6 bit LLR quantization, decoding with 8 LDPC iterations with 6 bit LLR quantization, and decoding with 6 LDPC iterations with 4 bit LLR quantization. In example 540, the supported module types for the HARQ buffer (e.g., supported HARQ buffer types) include a HARQ buffer with 6 bit quantization, a HARQ buffer with 5 bit quantization, and a HARQ buffer with 4 bit quantization. In some aspects, the supported module types, for each receiver module, may be represented using respective indexes. For example, for each receiver module, the list of supported module types that is included in the supported receiver type information transmitted from the UE to the network node may include the respective indexes representing the supported module types (e.g., without indicating the specific configurations represented by the indexes).

As shown in FIG. 5C, the supported receiver type information may include a power consumption metric per module type, for each receiver module. That is, the supported receiver type information may include a respective power consumption metric for each supported module type for each receiver module. For example, the power consumption metric (e.g., power factor in FIG. 5C) may indicate a scaling factor with respect to a power consumption of the most complex decoder type (e.g., the first decoder type listed in FIG. 5C). In some aspects, for each receiver module, the list of supported module types that is included in the supported receiver type information transmitted from the UE to the network node may indicate the respective indexes and the respective power consumption metrics (and possibly the respective performance metrics in some examples) for the supported module types without indicating the specific configurations for the supported module types.

In some cases, the UE may not support all combinations of the supported module types listed for a set of receiver modules (e.g., the demodulator, the decoder, and/or the HARQ buffer, among other examples). In some aspects, the UE may explicitly signal which combinations of the supported module types for the set of receiver modules are supported by the UE. For example, the supported receiver type information may include a list of supported combinations of the supported module types for the set of receiver modules. Alternatively, the supported receiver type information may include a list of combinations of the supported module types for the set of receiver modules that are not supported by the UE. In some other aspects, the supported combinations of the supported receiver types for the receiver modules may be based at least in part on one or more rules (e.g., pre-defined or configured rules) for combining the module types for the receiver modules in the Rx chain. In this case, the rules may have one or more parameters, and the UE may signal (e.g., in the supported receiver type information) the values for the one or more parameters. For example, different configurations (e.g., module types) can be distant k rows in the supported configurations table, which can be extended to $k_{ij}$ for limiting the distance between the configuration (e.g., module type) selected for component (e.g., receiver module) i and the configuration (e.g., module type) selected for component (e.g., receiver module) j. In another example, the UE may only support configurations (e.g., combinations of supported module types for the set of receiver modules) in which the power consumption metric for the decoder is no more than f times the power consumption metric for the demodulator.

Returning to FIG. 5A, as shown by reference number 510, the network node may select one or more receiver types, from the list of supported receiver types, to be used by the UE to receive one or more portions of a downlink communication. In some aspects, the network node may perform receiver type selection, from the receiver types supported by the UE, for each of multiple portions of a downlink communication to be allocated (e.g., scheduled) for the UE. For example, each portion of the downlink communication may be a portion of the downlink resources (e.g., time resources, frequency resources, and/or spatial resources) allocated for the downlink communication. The network node may select the receiver types in accordance with a granularity (e.g., a granularity of the downlink resources). For example, the granularity for the receiver type selection may be per RE, per RB, per group of RBs, per code block, per fraction of a code block, per group of code blocks, per transport block, or per spatial layer (e.g., for MIMO), among other examples. In some aspects, the network node may select a respective receiver type, from the supported receiver types, for each of multiple portions of the downlink communication, and the portions of the downlink communication may be defined in accordance with the granularity. For example, the network node may select a respective receiver type for each of multiple REs, RBs, groups of RBs, code blocks, fractions of a code block, groups of code blocks, transport blocks, or spatial layers, among other examples, of the downlink communication. In this way, the network node may select different receiver types to be used by the UE to receive different portions of a downlink communication.

In some aspects, the network node may select the receiver types for the portions of the downlink communication based at least in part on channel conditions between the UE and the network node. For example, the network node may select the receiver type for each portion of the downlink communication based at least in part on channel conditions associated with that portion of the downlink communication (e.g., the channel conditions for downlink channel resources corresponding to that portion of the downlink communication). In some aspects, the network node may select the receiver types for the portions of the downlink communication, based at least in part on the channel conditions, to minimize or attempt to minimize power consumption by the UE without adversely affecting (or minimally affecting) performance (e.g., spectral efficiency and/or throughput). For example, the network node may select a combination of low power receiver types (e.g., with MMSE demodulation) and high power receiver types (e.g., with PSRD modulation) across the different portions of the downlink communication (e.g., across REs. RBs, code blocks, or other portions of the downlink communication) to minimize or reduce power consumption without penalizing throughput.

In some aspects, the network node may determine the channel conditions based at least in part on one or more SRSs transmitted by the UE. In this case, the network node may rely on channel reciprocity between uplink and downlink channels to use uplink channel conditions measured using SRS channel estimation to determine downlink channel conditions. In some aspects, the network node, to determine the channel conditions, may measure one or more link condition metrics (e.g., signal-to-noise ratio (SNR) and/or reference signal received power (RSRP), among other examples) from an SRS or channel state information feedback (CSF) transmitted by the UE. In some aspects, the network node may select the receiver types for the portions of the downlink communication, based at least in part on the channel conditions, using a trained machine learning model, such as a trained neural network. For example, the machine learning model may input the one or more link condition metrics and generate/output receiver type instructions that indicate selected receiver types at a granularity within a slot.

In some aspects, the network node may select the receiver types for the portions of the downlink communication based at least in part on the channel conditions between the UE and the network node, the power consumption metrics for the supported receiver type (e.g., a respective power consumption metric for each supported receiver type), and/or the performance metrics for the supported receiver types (e.g., a respective performance metric for each supported receiver type). As described above, the performance metrics may be determined (e.g., learned) by the network node, or the performance metrics may be signaled by the UE (e.g., included in the supported receiver type information). In some aspects, based at least in part on the channel conditions, the power consumption metrics, and the performance metrics, the network node may select, for a given portion of the downlink communication in accordance with the granularity, a lowest power consuming receiver type that satisfies a performance criterion (e.g., an estimated loss in throughput or spectral efficiency is less than a threshold) for the channel conditions. In some aspects, the trained machine learning model (e.g., the trained neural network) may input the link condition metrics, the power consumption metrics for the supported receiver types, and/or the performance metrics for the supported receiver types, and the trained machine learning model may output the selected receiver types for the portions of the downlink communication.

In some aspects, such as in example 530 shown in FIG. 5B, each supported receiver type, in the list of supported receiver types, may correspond to a receiver configuration for a combination of multiple receiver modules of the Rx chain of the UE, and each supported receiver type may be represented by a scalar value (e.g., an index). In this case, the network node may select a respective receiver type for each portion of the downlink communication. For example, the trained machine learning model (e.g., the trained neural network) may output the respective index identifying each selected receiver type.

In some aspects, such as in example 540 shown in FIG. 5C, the supported receiver type information may include respective listings of module types (e.g., configuration options) for a set of receiver modules in the Rx chain of the UE. In this case, the network node may select combinations of module types for the set of receiver modules to be used by the UE for receiving different portions of the downlink communication. In some aspects, the network node may select module types for different receiver modules/components with different granularities. For example, the network node may select demodulator types, from the supported demodulator types, with a first granularity (e.g., per RE or per RB), the network node may select decoder types, from the supported decoder types, with a second granularity (e.g., per codebook or per fraction of a codebook), and the network node may select HARQ buffer types, from the supported HARQ buffer types, with a third granularity (e.g., per re-transmission number or per code block). In some aspects, the trained machine learning model (e.g., the trained neural network) may output the selected module types for each receiver module in the set of receiver modules in accordance with a respective granularity associated with each receiver module in the set of receiver modules. In this case, the trained machine learning model (e.g., the trained neural network) may input the per module type power metrics for the module types of the set of receiver modules. In some aspects, the network node may select the combinations of module types for the set of receiver modules based at least in part on a list of supported combinations of module types for the set of receiver modules included in the supported receiver type information, a list of non-supported combinations of module types for the set of receiver modules included in the supported receiver type information, or parameters for one or more rules for combining module types for the set of receiver modules included in the supported receiver type information.

As further shown in FIG. 5A, and by reference number 515, the network node may transmit, and the UE may receive, an indication of a granularity associated with signaling to indicate selected receiver types for receiving a downlink communication. The indication of the granularity may be included in control signaling, such as an RRC message or a MAC-CE. The indication of the granularity may indicate a granularity (or granularities) to be used in an indication of selected receiver types for receiving portions of a downlink communication. The indicated granularity (or granularities) to be used in the indication of the selected receiver types may be the same granularity (or granularities) used for selecting the selected receiver types.

In some aspects, in a case in which each selected receiver type is represented by a scalar value (e.g., an index) and corresponds to combined configuration of a set of Rx modules in the Rx chain of the UE, such as in example 530 shown in FIG. 5B, the granularity signaling (e.g., the indication of the granularity) may indicate a granularity at which the selected receiver types are to be indicated in the indication of the selected receiver types. For example, the granularity may be per RE, per RB, per group of RBs, per code block, per fraction of a code block, per group of code blocks, per transport block, or per spatial layer, among other examples.

In some aspects, in a case in which selected module types for different receiver modules in the Rx chain of the UE are separately indicated in the indication of the selected receiver types, such as in example 540 of FIG. 5C, the granularity signaling (e.g., the indication of the granularity) may indicate a respective granularity associated with each receiver module in a set of receiver modules. The granularity associated with a receiver module is the granularity at which the selected module types for the receiver module are to be indicated in the indication of the selected receiver types. In some aspects, the granularity signaling may indicate a first granularity associated with a first receiver module and a second granularity, associated with a second receiver module, that is different from the first granularity. For example, the granularity signaling may indicate a first granularity (e.g., per RE or per RB) for the demodulator and a second granularity (e.g., per code block or per fraction of a code block) for the decoder.

As further shown in FIG. 5A, and by reference number 520, the network node may transmit, and the UE may receive, an indication of the selected receiver types to be used for receiving portions of a downlink communication.

For example, the indication of the selected receiver types may be included in DCI or a MAC-CE. In some aspects, the indication of the selected receiver types for receiving portions of a downlink communication may be included in allocation signaling (e.g., DCI) that allocates/schedules the downlink communication for the UE, or is otherwise associated with the allocation signaling for the downlink communication. That is, the network node may dynamically indicate, per allocation signaling for a downlink communication, the selected receiver types to be used by the UE to receive portions of the downlink communication.

In some aspects, such as in example 530 shown in FIG. 5B, the indication of the selected receiver types may indicate each selected receiver type using a respective scalar value (e.g., an index) associated with the selected receiver type. In this case, each of the supported receiver types may be associated with a respective index and may correspond to a combined configuration of a set of receiver modules of the Rx chain of the UE. The indication of the selected receiver types may indicate an index associated with a respective receiver type for each of multiple portions of the downlink communication in accordance with a granularity. For example, the granularity may be per RE, per RB, per group of RBs, per code block, per fraction of a code block, per group of code blocks, per transport block, or per spatial layer, among other examples. The indication of the granularity used for indicating the selected receiver types may be indicated in separate granularity signaling, as described above in connection with reference number 515.

In one example, referring to FIG. 5B, the granularity signaling (e.g., the indication of the granularity) may indicate that the granularity used for indicating the selected receiver types is per RB. The per allocation signaling for a downlink communication allocated for the UE (e.g., including the indication of selected receiver types for the downlink communication) may indicate selected receiver types for different RBs allocated for the downlink communication. For example, indication of the selected receiver types included in the per allocation signaling may indicate receiver type 1 for a first RB and receiver type 2 for a second RB. In this case, the UE may use the receiver configuration corresponding to receiver type 1 (e.g., PSRD and soft LDPC decoding with 6 bit LLR quantization) for receiving the first RB of the downlink communication, and the UE may use the receiver configuration corresponding to receiver type 2 (e.g., MMSE and soft LDPC decoding with 6 bit LLR quantization) for receiving the second RB of the downlink communication.

In some aspects, such as in example 540 shown in FIG. 5C, the indication of the selected receiver types may include separate fields for indicating selected module types for each receiver module of a set of receiver modules in an Rx chain of the UE. For example, the values of the separate fields for indicating the selected module types for the set of receiver modules may form vectors that represent selected receiver types. The indication of the selected receiver types may include, for each receiver module in the set of receiver modules, a respective indication of selected module types, from the respective list of supported module types, in accordance with a respective granularity. For example, the indication of the selected receiver types may include an indication of selected demodulator types in accordance with a first granularity, an indication of selected decoder types in accordance with a second granularity, and an indication of selected HARQ buffer types in accordance with a third granularity. The indication of the respective granularity used for indicating the selected module types for each receiver module may be indicated in separate granularity signaling, as described above in connection with reference number 515.

In one example, referring to FIG. 5B, the granularity signaling (e.g., the indication of the granularity) may indicate a per RB granularity for the demodulator, a per code block granularity for the decoder, and a per code block granularity for the HARQ buffer. The per allocation signaling for a downlink communication allocated for the UE (e.g., including the indication of selected receiver types for the downlink communication) may indicate selected demodulation types for different RBs allocated for the downlink communication, selected decoder types for different code blocks of the downlink communication, and different HARQ buffer types for different code blocks of the downlink communication. For example, indication of the selected receiver types included in the per allocation signaling may indicate a first demodulation type (e.g., PSRD with a search space of 256) for a first RB and a second demodulation type (e.g., MMSE) for a second RB. The indication of the selected receiver types included in the per allocation signaling may indicate a first decoder type (e.g., decoding with 12 LDPC iterations with 6 bit LLR quantization) for a first code block and a second decoder type (e.g., decoding with 8 LDPC iterations with 6 bit LLR quantization) for a second code block. The indication of the selected receiver types included in the per allocation signaling may indicate a first HARQ buffer type (e.g., 6 bit quantization) for the first code block and a second HARQ buffer type (e.g., 5 bit LLR quantization) for the second code block. In this case, the UE may use the first demodulator type for receiving/demodulating the first RB of the downlink communication, and the UE may use the second demodulator type for receiving/demodulating the second RB of the downlink communication. The UE may use the first decoder type and the first HARQ buffer type when decoding the first code block of the downlink communication, and the UE may use the second decoder type and the second HARQ buffer type when decoding the second code block of the downlink communication.

Returning to FIG. 5A, as shown by reference number 525, the network node may transmit the downlink communication to the UE. For example, the network node may transmit the portions of the downlink communication to be received by the UE using the selected receiver types. The UE may receive the portions of the downlink communication using the selected receiver types indicated for the portions of the downlink communication. In some aspects, receiving the portions of the downlink communication may include demodulating portions of the downlink communication, decoding portions of the downlink communication, buffering portions of the downlink communication, and/or performing other processing of the portions of the downlink communication by one or more receiver modules in the Rx chain of the UE. In some aspects, the UE may receive (e.g., demodulate and/or decode, among other examples) the portions of the downlink communication using the selected receiver types and/or selected module types indicated for the portions of the downlink communication.

In some aspects, the UE may use different receiver types (each corresponding to a combined configuration for multiple receiver modules of the Rx chain) to receive (e.g., demodulate and/or decode, among other examples) different portions of the downlink communication in accordance with a certain granularity (e.g., per RE, per RB, or per code block, among other examples). In some aspects, the UE may use different module types for a set of receiver modules (e.g., different demodulator types and/or different decoder types, among other examples) for different portions of the downlink communication in accordance with granularities associated with the receiver modules. As a result, the UE may switch between different demodulators and/or different parameters for other receiver modules when receiving, demodulating, and/or decoding different portions (e.g., REs, RBs, or code blocks, among other examples) of a downlink communication. Such switching between different decoders and/or other parameters for other receiver modules for receiving different resources of a downlink communication in accordance with the selection of the receiver types (or module types) performed by the network node based at least in part on the channel conditions may result in decreased power consumption for the UE, without adversely affecting throughput or spectral efficiency.

As indicated above, FIGS. 5A-5C are provided as an example. Other examples may differ from what is described with respect to FIGS. 5A-5C.

FIG. 6 shows a method 600 for wireless communication by a UE, such as UE 120.

Method 600 begins at 610 with transmitting, to a network node, supported receiver type information including a list of one or more receiver types supported by the UE.

Method 600 then proceeds to step 620 with receiving, from the network node, an indication of one or more selected receiver types, from the one or more receiver types supported by the UE, to be used for receiving one or more portions of a downlink communication.

Method 600 then proceeds to step 630 with receiving, from the network node, the one or more portions of the downlink communication using the one or more selected receiver types.

In one aspect, the supported receiver type information includes a respective power consumption metric for each receiver type of the one or more receiver types.

In one aspect, the respective power consumption metric for each receiver type of the one or more receiver types indicates a scaling factor with respect to a reference receiver type.

In one aspect, the one or more selected receiver types are based at least in part on link conditions between the UE and the network node, the respective power consumption metric for each receiver type of the one or more receiver types, and a respective performance metric for each receiver type of the one or more receiver types.

In one aspect, the supported receiver type information includes the respective performance metric for each receiver type of the one or more receiver types.

In one aspect, the indication of the one or more selected receiver types indicates a respective selected receiver type, of the one or more selected receiver types, for each of the one or more portions of the downlink communication in accordance with a granularity, and the granularity is per RE, per RB, per group of RBs, per code block, per fraction of a code block, per group of code blocks, or per spatial layer.

In one aspect, method 600 further includes receiving, from the network node, an indication of the granularity the indication.

In a seventh aspect, each receiver type, of the one or more receiver types, corresponds to a respective configuration of module types for a set of receiver modules in an Rx chain of the UE, and each receiver type, of the one or more receiver types, is associated with a respective index.

In one aspect, the indication of the one or more selected receiver types indicates, for each selected receiver type of the one or more selected receiver types, an index associated with the selected receiver type.

In one aspect, the list of the one or more receiver types includes a respective list of one or more supported module types for each receiver module of a set of receiver modules in an Rx chain of the UE, and the indication of the one or more selected receiver types includes a respective indication of one or more selected module types, from the respective list of one or more supported module types, for each receiver module of the set of receiver modules in the Rx chain of the UE.

In one aspect, the supported receiver type information includes a respective power consumption metric for each supported module type of the one or more supported module types for each receiver module of the set of receiver modules in the Rx chain of the UE.

In one aspect, the respective indication of the one or more selected module types, for each receiver module of the set of receiver modules in the Rx chain of the UE, is associated with a respective granularity.

In one aspect, the respective indication of the one or more selected module types for a first receiver module of the set of receiver modules is associated with a first granularity, and the respective indication of the one or more selected module types for a second receiver module of the set of receiver modules is associated with a second granularity that is different from the first granularity.

In one aspect, method 600 further includes receiving, from the network node, an indication of the respective granularity associated with the respective indication of the one or more selected module types for each receiver module of the set of receiver modules in the Rx chain of the UE.

In one aspect, the set of receiver modules includes a demodulator, a decoder, and a HARQ buffer.

In one aspect, the supported receiver type information includes a list of supported combinations of module types for the set of receiver modules in the Rx chain of the UE.

In one aspect, the supported receiver type information includes one or more parameters for one or more rules for combining module types for the set of receiver modules in the Rx chain of the UE.

In one aspect, method 600, or any aspect related to it, may be performed by an apparatus, such as communications device 800 of FIG. 8, which includes various components operable, configured, or adapted to perform the method 600. Communications device 800 is described below in further detail.

Note that FIG. 6 is just one example of a method, and other methods including fewer, additional, or alternative steps are possible consistent with this disclosure.

Figure 7:
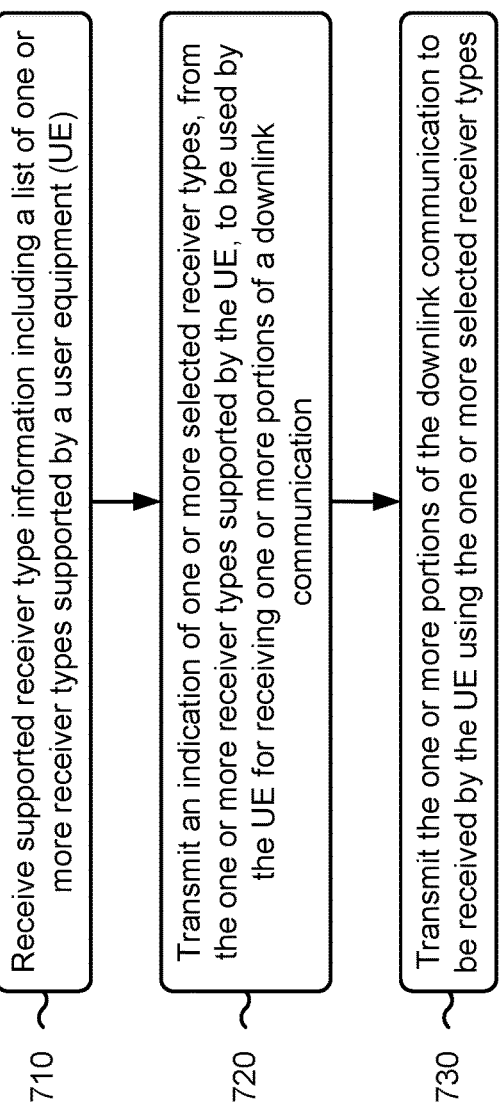
FIG. 7 shows a method for wireless communication by a network node.

FIG. 7 shows a method 700 for wireless communication by a network node, such as BS 110, or a disaggregated base station as discussed with respect to FIG. 3.

Method 700 begins at 710 with receiving supported receiver type information including a list of one or more receiver types supported by a UE.

Method 700 then proceeds to step 720 with transmitting an indication of one or more selected receiver types, from the one or more receiver types supported by the UE, to be used by the UE for receiving one or more portions of a downlink communication.

Method 700 then proceeds to step 730 with transmitting the one or more portions of the downlink communication to be received by the UE using the one or more selected receiver types.

In one aspect, the supported receiver type information includes a respective power consumption metric for each receiver type of the one or more receiver types.

In one aspect, the respective power consumption metric for each receiver type of the one or more receiver types indicates a scaling factor with respect to a reference receiver type.

In one aspect, method 700 further includes selecting the one or more selected receiver types, from the one or more receiver types supported by the UE, based at least in part on link conditions between the UE and the network node, the respective power consumption metric for each receiver type of the one or more receiver types, and a respective performance metric for each receiver type of the one or more receiver types.

In one aspect, the supported receiver type information includes the respective performance metric for each receiver type of the one or more receiver types.

In one aspect, method 700 further includes determining the respective performance metric for each receiver type of the one or more receiver types.

In one aspect, method 700 further includes selecting the one or more selected receiver types, from the one or more receiver types supported by the UE, based at least in part on one or more measured link condition metrics.

In one aspect, the indication of the one or more selected receiver types indicates a respective selected receiver type, of the one or more selected receiver types, for each of the one or more portions of the downlink communication in accordance with a granularity, and the granularity is per RE, per RB, per group of RBs, per code block, per fraction of a code block, per group of code blocks, or per spatial layer.

In one aspect, method 700 further includes transmitting an indication of the granularity.

In one aspect, each receiver type, of the one or more receiver types, corresponds to a respective configuration of module types for a set of receiver modules in an Rx chain of the UE, and each receiver type, of the one or more receiver types, is associated with a respective index.

In one aspect, the indication of the one or more selected receiver types indicates, for each selected receiver type of the one or more selected receiver types, an index associated with the selected receiver type.

In one aspect, the list of the one or more receiver types includes a respective list of one or more supported module types for each receiver module of a set of receiver modules in an Rx chain of the UE, and the indication of the one or more selected receiver types includes a respective indication of one or more selected module types, from the respective list of one or more supported module types, for each receiver module of the set of receiver modules in the Rx chain of the UE.

In one aspect, the supported receiver type information includes a respective power consumption metric for each supported module type of the one or more supported module types for each receiver module of the set of receiver modules in the Rx chain of the UE.

In one aspect, the respective indication of the one or more selected module types, for each receiver module of the set of receiver modules in the Rx chain of the UE, is associated with a respective granularity.

In one aspect, the respective indication of the one or more selected module types for a first receiver module of the set of receiver modules is associated with a first granularity, and the respective indication of the one or more selected module types for a second receiver module of the set of receiver modules is associated with a second granularity that is different from the first granularity.

In one aspect, method 700 further includes transmitting an indication of the respective granularity associated with the respective indication of the one or more selected module types for each receiver module of the set of receiver modules in the Rx chain of the UE.

In one aspect, the set of receiver modules includes a demodulator, a decoder, and a HARQ buffer.

In one aspect, the supported receiver type information includes a list of supported combinations of module types for the set of receiver modules in the Rx chain of the UE.

In one aspect, the supported receiver type information includes one or more parameters for one or more rules for combining module types for the set of receiver modules in the Rx chain of the UE.

In one aspect, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative steps are possible consistent with this disclosure.

FIG. 8 is a diagram illustrating an example of an implementation of code and circuitry for a communications device 800, in accordance with the present disclosure. The communications device 800 may be a UE, or a UE may include the communications device 800.

The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes one or more processors 820. In various aspects, the one or more processors 820 may be representative of one or more of receive processor 258, transmit processor 264, TX MIMO processor 266, and/or controller/processor 280, as described with respect to FIG. 2. The one or more processors 820 are coupled to a computer-readable medium/memory 830 via a bus 806. In various aspects, the computer-readable medium/memory 830 may be representative of memory 282, as described with respect to FIG. 2. In certain aspects, the computer-readable medium/memory 830 is configured to store instructions (e.g., computer-executable code, processor-executable code) that when executed by the one or more processors 820, cause the one or more processors 820 to perform the method 600 described with respect to FIG. 6, or any aspect related to it. Note that reference to a processor performing a function of communications device 800 may include one or more processors performing that function of communications device 800.

As shown in FIG. 8, the communications device 800 may include circuitry for transmitting, to a network node, supported receiver type information including a list of one or more receiver types supported by the UE (circuitry 835).

As shown in FIG. 8, the communications device 800 may include, stored in computer-readable medium/memory 830, code for transmitting, to a network node, supported receiver type information including a list of one or more receiver types supported by the UE (code 840).

As shown in FIG. 8, the communications device 800 may include circuitry for receiving, from the network node, an indication of one or more selected receiver types, from the one or more receiver types supported by the UE, to be used for receiving one or more portions of a downlink communication (circuitry 845).

As shown in FIG. 8, the communications device 800 may include, stored in computer-readable medium/memory 830, code for receiving, from the network node, an indication of one or more selected receiver types, from the one or more receiver types supported by the UE, to be used for receiving one or more portions of a downlink communication (code 850).

As shown in FIG. 8, the communications device 800 may include circuitry for receiving, from the network node, the one or more portions of the downlink communication using the one or more selected receiver types (circuitry 855).

As shown in FIG. 8, the communications device 800 may include, stored in computer-readable medium/memory 830, code for receiving, from the network node, the one or more portions of the downlink communication using the one or more selected receiver types (code 860).

Various components of the communications device 800 may provide means for performing the method 600 described with respect to FIG. 6, or any aspect related to it. For example, means for transmitting, sending, or outputting for transmission may include the transceiver(s) 254 and/or antenna(s) 252 of the UE 120 and/or transceiver 808 and antenna 810 of the communications device 800 in FIG. 8. Means for receiving or obtaining may include the transceiver(s) 254 and/or antenna(s) 252 of the UE 120 and/or transceiver 808 and antenna 810 of the communications device 800 in FIG. 8.

FIG. 8 is provided as an example. Other examples may differ from what is described in connection with FIG. 8.

FIG. 9 is a diagram illustrating an example of an implementation of code and circuitry for a communications device 900, in accordance with the present disclosure. The communications device 900 may be a network node (such as BS 110 or a disaggregated base station as described with regard to FIG. 3), or a network node may include the communications device 900.

The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The network interface 912 is configured to obtain and send signals for the communications device 900 via communications link(s), such as a backhaul link, midhaul link, and/or fronthaul link as described herein, such as with respect to FIG. 3. The processing system 902 may be configured to perform processing functions for the communications device 900, including processing signals received and/or to be transmitted by the communications device 900.

The processing system 902 includes one or more processors 920. In various aspects, the one or more processors 920 may be representative of one or more of receive processor 238, transmit processor 220, TX MIMO processor 230, and/or controller/processor 240, as described with respect to FIG. 2. The one or more processors 920 are coupled to a computer-readable medium/memory 930 via a bus 906. In various aspects, the computer-readable medium/memory 930 may be representative of memory 242, as described with respect to FIG. 2. In certain aspects, the computer-readable medium/memory 930 is configured to store instructions (e.g., computer-executable code, processor-executable code)

that when executed by the one or more processors 920, cause the one or more processors 920 to perform the method 700 described with respect to FIG. 7, or any aspect related to it. Note that reference to a processor performing a function of communications device 900 may include one or more processors performing that function of communications device 900.

As shown in FIG. 9, the communications device 900 may include circuitry for receiving supported receiver type information including a list of one or more receiver types supported by a UE (circuitry 935).

As shown in FIG. 9, the communications device 900 may include, stored in computer-readable medium/memory 930, code for receiving supported receiver type information including a list of one or more receiver types supported by a UE (code 940).

As shown in FIG. 9, the communications device 900 may include circuitry for transmitting an indication of one or more selected receiver types, from the one or more receiver types supported by the UE, to be used by the UE for receiving one or more portions of a downlink communication (circuitry 945).

As shown in FIG. 9, the communications device 900 may include, stored in computer-readable medium/memory 930, code for transmitting an indication of one or more selected receiver types, from the one or more receiver types supported by the UE, to be used by the UE for receiving one or more portions of a downlink communication (code 950).

As shown in FIG. 9, the communications device 900 may include circuitry for transmitting the one or more portions of the downlink communication to be received by the UE using the one or more selected receiver types (circuitry 955).

As shown in FIG. 9, the communications device 900 may include, stored in computer-readable medium/memory 930, code for transmitting the one or more portions of the downlink communication to be received by the UE using the one or more selected receiver types (code 960).

Various components of the communications device 900 may provide means for performing the method 700 described with respect to FIG. 7, or any aspect related to it. For example, means for transmitting, sending, or outputting for transmission may include the transceiver(s) 232 and/or antenna(s) 234 of the BS 110 and/or transceiver 908 and antenna 910 of the communications device 900 in FIG. 9. Means for receiving or obtaining may include the transceiver(s) 232 and/or antenna(s) 234 of the BS 110 and/or transceiver 908 and antenna 910 of the communications device 900 in FIG. 9.

FIG. 9 is provided as an example. Other examples may differ from what is described in connection with FIG. 9.

The following provides an overview of some Aspects of the present disclosure:

Aspect 1: A method of wireless communication performed by a user equipment (UE), comprising: transmitting, to a network node, supported receiver type information including a list of one or more receiver types supported by the UE; receiving, from the network node, an indication of one or more selected receiver types, from the one or more receiver types supported by the UE, to be used for receiving one or more portions of a downlink communication; and receiving, from the network node, the one or more portions of the downlink communication using the one or more selected receiver types.

Aspect 2: The method of Aspect 1, wherein the supported receiver type information includes a respective power consumption metric for each receiver type of the one or more receiver types.

Aspect 3: The method of Aspect 2, wherein the respective power consumption metric for each receiver type of the one or more receiver types indicates a scaling factor with respect to a reference receiver type.

Aspect 4: The method of any of Aspects 2-3, wherein the one or more selected receiver types are based at least in part on link conditions between the UE and the network node, the respective power consumption metric for each receiver type of the one or more receiver types, and a respective performance metric for each receiver type of the one or more receiver types.

Aspect 5: The method of Aspect 4, wherein the supported receiver type information includes the respective performance metric for each receiver type of the one or more receiver types.

Aspect 6: The method of any of Aspects 1-5, wherein the indication of the one or more selected receiver types indicates a respective selected receiver type, of the one or more selected receiver types, for each of the one or more portions of the downlink communication in accordance with a granularity, and wherein the granularity is per resource element (RE), per resource block (RB), per group of RBs, per code block, per fraction of a code block, per group of code blocks, or per spatial layer.

Aspect 7: The method of Aspect 6, further comprising: receiving, from the network node, an indication of the granularity the indication.

Aspect 8: The method of any of Aspects 1-7, wherein each receiver type, of the one or more receiver types, corresponds to a respective configuration of module types for a set of receiver modules in a receive (Rx) chain of the UE, and wherein each receiver type, of the one or more receiver types, is associated with a respective index.

Aspect 9: The method of Aspect 8, wherein the indication of the one or more selected receiver types indicates, for each selected receiver type of the one or more selected receiver types, an index associated with the selected receiver type.

Aspect 10: The method of any of Aspects 1-7, wherein the list of the one or more receiver types includes a respective list of one or more supported module types for each receiver module of a set of receiver modules in a receive (Rx) chain of the UE, and wherein the indication of the one or more selected receiver types includes a respective indication of one or more selected module types, from the respective list of one or more supported module types, for each receiver module of the set of receiver modules in the Rx chain of the UE.

Aspect 11: The method of Aspect 10, wherein the supported receiver type information includes a respective power consumption metric for each supported module type of the one or more supported module types for each receiver module of the set of receiver modules in the Rx chain of the UE.

Aspect 12: The method of any of Aspects 10-11, wherein the respective indication of the one or more selected module types, for each receiver module of the set of receiver modules in the Rx chain of the UE, is associated with a respective granularity.

Aspect 13: The method of Aspect 12, wherein the respective indication of the one or more selected module types for a first receiver module of the set of receiver modules is associated with a first granularity, and wherein the respective indication of the one or more selected module types for a second receiver module of the set of receiver modules is associated with a second granularity that is different from the first granularity.

Aspect 14: The method of any of Aspects 12-13, further comprising: receiving, from the network node, an indication of the respective granularity associated with the respective indication of the one or more selected module types for each receiver module of the set of receiver modules in the Rx chain of the UE.

Aspect 15: The method of any of Aspects 10-14, wherein the set of receiver modules includes a demodulator, a decoder, and a hybrid automatic repeat request (HARQ) buffer.

Aspect 16: The method of any of Aspects 10-15, wherein the supported receiver type information includes a list of supported combinations of module types for the set of receiver modules in the Rx chain of the UE.

Aspect 17: The method of any of Aspects 10-15, wherein the supported receiver type information includes one or more parameters for one or more rules for combining module types for the set of receiver modules in the Rx chain of the UE.

Aspect 18: A method of wireless communication performed by a network node, comprising: receiving supported receiver type information including a list of one or more receiver types supported by a user equipment (UE); transmitting an indication of one or more selected receiver types, from the one or more receiver types supported by the UE, to be used by the UE for receiving one or more portions of a downlink communication; and transmitting the one or more portions of the downlink communication to be received by the UE using the one or more selected receiver types.

Aspect 19: The method of Aspect 18, wherein the supported receiver type information includes a respective power consumption metric for each receiver type of the one or more receiver types.

Aspect 20: The method of Aspect 19, wherein the respective power consumption metric for each receiver type of the one or more receiver types indicates a scaling factor with respect to a reference receiver type.

Aspect 21: The method of any of Aspects 19-20, further comprising: selecting the one or more selected receiver types, from the one or more receiver types supported by the UE, based at least in part on link conditions between the UE and the network node, the respective power consumption metric for each receiver type of the one or more receiver types, and a respective performance metric for each receiver type of the one or more receiver types.

Aspect 22: The method of Aspect 21, wherein the supported receiver type information includes the respective performance metric for each receiver type of the one or more receiver types.

Aspect 23: The method of Aspect 21, further comprising: determining the respective performance metric for each receiver type of the one or more receiver types.

Aspect 24: The method of any of Aspects 18-23, further comprising: selecting the one or more selected receiver types, from the one or more receiver types supported by the UE, based at least in part on one or more measured link condition metrics.

Aspect 25: The method of any of Aspects 18-24, wherein the indication of the one or more selected receiver types indicates a respective selected receiver type, of the one or more selected receiver types, for each of the one or more portions of the downlink communication in accordance with a granularity, and wherein the granularity is per resource element (RE), per resource block (RB), per group of RBs, per code block, per fraction of a code block, per group of code blocks, or per spatial layer.

Aspect 26: The method of Aspect 25, further comprising: transmitting an indication of the granularity.

Aspect 27: The method of any of Aspects 18-26, wherein each receiver type, of the one or more receiver types, corresponds to a respective configuration of module types for a set of receiver modules in a receive (Rx) chain of the UE, and wherein each receiver type, of the one or more receiver types, is associated with a respective index.

Aspect 28: The method of Aspect 27, wherein the indication of the one or more selected receiver types indicates, for each selected receiver type of the one or more selected receiver types, an index associated with the selected receiver type.

Aspect 29: The method of any of Aspects 18-26, wherein the list of the one or more receiver types includes a respective list of one or more supported module types for each receiver module of a set of receiver modules in a receive (Rx) chain of the UE, and wherein the indication of the one or more selected receiver types includes a respective indication of one or more selected module types, from the respective list of one or more supported module types, for each receiver module of the set of receiver modules in the Rx chain of the UE.

Aspect 30: The method of Aspect 29, wherein the supported receiver type information includes a respective power consumption metric for each supported module type of the one or more supported module types for each receiver module of the set of receiver modules in the Rx chain of the UE.

Aspect 31: The method of any of Aspects 29-30, wherein the respective indication of the one or more selected module types, for each receiver module of the set of receiver modules in the Rx chain of the UE, is associated with a respective granularity.

Aspect 32: The method of Aspect 31, wherein the respective indication of the one or more selected module types for a first receiver module of the set of receiver modules is associated with a first granularity, and wherein the respective indication of the one or more selected module types for a second receiver module of the set of receiver modules is associated with a second granularity that is different from the first granularity.

Aspect 33: The method of any of Aspects 31-32, further comprising: transmitting an indication of the respective granularity associated with the respective indication of the one or more selected module types for each receiver module of the set of receiver modules in the Rx chain of the UE.

Aspect 34: The method of any of Aspects 29-33, wherein the set of receiver modules includes a demodulator, a decoder, and a hybrid automatic repeat request (HARQ) buffer.

Aspect 35: The method of any of Aspects 29-34, wherein the supported receiver type information includes a list of supported combinations of module types for the set of receiver modules in the Rx chain of the UE.

Aspect 36: The method of any of Aspects 29-34, wherein the supported receiver type information includes one or more parameters for one or more rules for combining module types for the set of receiver modules in the Rx chain of the UE.

Aspect 37: An apparatus for wireless communication at a device, comprising a processor; memory coupled with the processor; and instructions stored in the memory and executable by the processor to cause the apparatus to perform the method of one or more of Aspects 1-36.

Aspect 38: A device for wireless communication, comprising a memory and one or more processors coupled to the memory, the one or more processors configured to perform the method of one or more of Aspects 1-36.

Aspect 39: An apparatus for wireless communication, comprising at least one means for performing the method of one or more of Aspects 1-36.

Aspect 40: A non-transitory computer-readable medium storing code for wireless communication, the code comprising instructions executable by a processor to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:
a memory; and
one or more processors, coupled to the memory, configured to:
transmit, to a network node, supported receiver type information including a list of one or more receiver types supported by the UE, wherein the supported receiver type information includes a respective power consumption metric for each receiver type of the one or more receiver types, wherein the respective power consumption metric for each receiver type of the one or more receiver types indicates a scaling factor with respect to a reference receiver type;
receive, from the network node, an indication of one or more selected receiver types, from the one or more receiver types supported by the UE, to be used for receiving one or more portions of a downlink communication; and
receive, from the network node, the one or more portions of the downlink communication using the one or more selected receiver types.

2. The UE of claim 1, wherein the one or more selected receiver types are based at least in part on link conditions between the UE and the network node, the respective power consumption metric for each receiver type of the one or more receiver types, and a respective performance metric for each receiver type of the one or more receiver types.

3. The UE of claim 1, wherein each receiver type, of the one or more receiver types, corresponds to a respective configuration of module types for a set of receiver modules in a receive (Rx) chain of the UE, and wherein each receiver type, of the one or more receiver types, is associated with a respective index.

4. The UE of claim 3, wherein the indication of the one or more selected receiver types indicates, for each selected receiver type of the one or more selected receiver types, an index associated with the selected receiver type.

5. The UE of claim 1, wherein the list of the one or more receiver types includes a respective list of one or more supported module types for each receiver module of a set of receiver modules in a receive (Rx) chain of the UE, and wherein the indication of the one or more selected receiver types includes a respective indication of one or more selected module types, from the respective list of one or more supported module types, for each receiver module of the set of receiver modules in the Rx chain of the UE.

6. The UE of claim 5, wherein the supported receiver type information includes a respective power consumption metric for each supported module type of the one or more supported module types for each receiver module of the set of receiver modules in the Rx chain of the UE.

7. The UE of claim 5, wherein the respective indication of the one or more selected module types, for each receiver module of the set of receiver modules in the Rx chain of the UE, is associated with a respective granularity.

8. The UE of claim 5, wherein the supported receiver type information includes a list of supported combinations of module types for the set of receiver modules in the Rx chain of the UE.

9. The UE of claim 1, wherein the one or more selected receiver types are based at least in part on one or more measured link condition metrics.

10. The UE of claim 1, wherein the indication of the one or more selected receiver types indicates a respective selected receiver type, of the one or more selected receiver types, for each of the one or more portions of the downlink communication in accordance with a granularity.

11. A user equipment (UE) for wireless communication, comprising:
a memory; and
one or more processors, coupled to the memory, configured to:
transmit, to a network node, supported receiver type information including a list of one or more receiver types supported by the UE;
receive, from the network node, an indication of one or more selected receiver types, from the one or more receiver types supported by the UE, to be used for receiving one or more portions of a downlink communication, wherein the indication of the one or more selected receiver types indicates a respective selected receiver type, of the one or more selected receiver types, for each of the one or more portions of the downlink communication in accordance with a granularity, and wherein the granularity is per resource element (RE), per resource block (RB), per group of RBs, per code block, per fraction of a code block, per group of code blocks, or per spatial layer; and
receive, from the network node, the one or more portions of the downlink communication using the one or more selected receiver types.

12. The UE of claim 11, wherein the supported receiver type information includes a respective performance metric for each receiver type of the one or more receiver types.

13. The UE of claim 11, wherein the one or more processors are further configured to:
receive, from the network node, an indication of the granularity.

14. The UE of claim 11, wherein the indication of the one or more selected receiver types indicates a first receiver type for a first RB and a second receiver type for a second RB.

15. The UE of claim 11, wherein each receiver type, of the one or more receiver types, corresponds to a respective configuration of module types for a set of receiver modules in a receive (Rx) chain of the UE.

16. The UE of claim 15, wherein the set of receiver modules includes a demodulator, a decoder, and a hybrid automatic repeat request (HARQ) buffer.

17. A method of wireless communication performed by a user equipment (UE), comprising:

transmitting, to a network node, supported receiver type information including a list of one or more receiver types supported by the UE, wherein the supported receiver type information includes a respective power consumption metric for each receiver type of the one or more receiver types, wherein the respective power consumption metric for each receiver type of the one or more receiver types indicates a scaling factor with respect to a reference receiver type;

receiving, from the network node, an indication of one or more selected receiver types, from the one or more receiver types supported by the UE, to be used for receiving one or more portions of a downlink communication; and receiving, from the network node, the one or more portions of the downlink communication using the one or more selected receiver types.

18. The method of claim 17, wherein the one or more selected receiver types are based at least in part on link conditions between the UE and the network node, the respective power consumption metric for each receiver type of the one or more receiver types, and a respective performance metric for each receiver type of the one or more receiver types.

19. The method of claim 17, wherein each receiver type, of the one or more receiver types, corresponds to a respective configuration of module types for a set of receiver modules in a receive (Rx) chain of the UE, and wherein each receiver type, of the one or more receiver types, is associated with a respective index.

20. The method of claim 19, wherein the indication of the one or more selected receiver types indicates, for each selected receiver type of the one or more selected receiver types, an index associated with the selected receiver type.

21. The method of claim 17, wherein the list of the one or more receiver types includes a respective list of one or more supported module types for each receiver module of a set of receiver modules in a receive (Rx) chain of the UE, and wherein the indication of the one or more selected receiver types includes a respective indication of one or more selected module types, from the respective list of one or more supported module types, for each receiver module of the set of receiver modules in the Rx chain of the UE.

22. The method of claim 21, wherein the supported receiver type information includes a respective power consumption metric for each supported module type of the one or more supported module types for each receiver module of the set of receiver modules in the Rx chain of the UE.

23. The method of claim 21, wherein the respective indication of the one or more selected module types, for each receiver module of the set of receiver modules in the Rx chain of the UE, is associated with a respective granularity.

24. The method of claim 17, wherein the one or more selected receiver types are based at least in part on one or more measured link condition metrics.

25. The method of claim 17, wherein the indication of the one or more selected receiver types indicates a respective selected receiver type, of the one or more selected receiver types, for each of the one or more portions of the downlink communication in accordance with a granularity.

26. A method of wireless communication performed by a user equipment (UE), comprising:

transmitting, to a network node, supported receiver type information including a list of one or more receiver types supported by the UE;

receiving, from the network node, an indication of one or more selected receiver types, from the one or more receiver types supported by the UE, to be used for receiving one or more portions of a downlink communication, wherein the indication of the one or more selected receiver types indicates a respective selected receiver type, of the one or more selected receiver types, for each of the one or more portions of the downlink communication in accordance with a granularity, and wherein the granularity is per resource element (RE), per resource block (RB), per group of RBs, per code block, per fraction of a code block, per group of code blocks, or per spatial layer; and receiving, from the network node, the one or more portions of the downlink communication using the one or more selected receiver types.

27. The method of claim 26, wherein the supported receiver type information includes a respective performance metric for each receiver type of the one or more receiver types.

28. The method of claim 26, further comprising:

receiving, from the network node, an indication of the granularity.

29. The method of claim 26, wherein the indication of the one or more selected receiver types indicates a first receiver type for a first RB and a second receiver type for a second RB.

30. The method of claim 26, wherein each receiver type, of the one or more receiver types, corresponds to a respective configuration of module types for a set of receiver modules in a receive (Rx) chain of the UE.

31. The method of claim 30, wherein the set of receiver modules includes a demodulator, a decoder, and a hybrid automatic repeat request (HARQ) buffer.

\* \* \* \* \*